United States Patent [19]
Baxter

[11] 3,874,596
[45] Apr. 1, 1975

[54] FLUID DISPENSING DEVICE

[76] Inventor: Benjamin Baxter, P.O. Box 488, Fowler, Calif. 93625

[22] Filed: Feb. 11, 1974

[21] Appl. No.: 441,136

[52] U.S. Cl.............. 239/542, 239/207, 137/236, 137/593
[51] Int. Cl............................................ B05b 15/00
[58] Field of Search ........... 239/200, 201, 203, 207, 239/266, 542; 137/236, 280, 299, 592, 593

[56] References Cited
UNITED STATES PATENTS

| | | | |
|---|---|---|---|
| 2,031,754 | 2/1936 | Bacigalupi | 239/201 |
| 3,084,869 | 4/1963 | Hutty et al. | 239/201 |
| 3,159,172 | 12/1964 | Baxter | 239/542 X |

Primary Examiner—M. Henson Wood, Jr.
Assistant Examiner—John J. Love
Attorney, Agent, or Firm—Huebner & Worrel

[57] ABSTRACT

A device for the regulation of fluid discharge from a source of fluid, said device having a riser borne by the source in upright attitude; a mounting plate secured in the riser extending substantially transversely thereof having a passage therethrough; a tubular member having an end portion compressible by insertion in the passage to mount the member in upright attitude in the riser; and a sleeve telescopically mounted on the tubular member remote from the compressible end portion and endwardly adjustable on the member to regulate the hydrostatic head of fluid pressure required for fluid discharge through the riser from the source.

10 Claims, 6 Drawing Figures

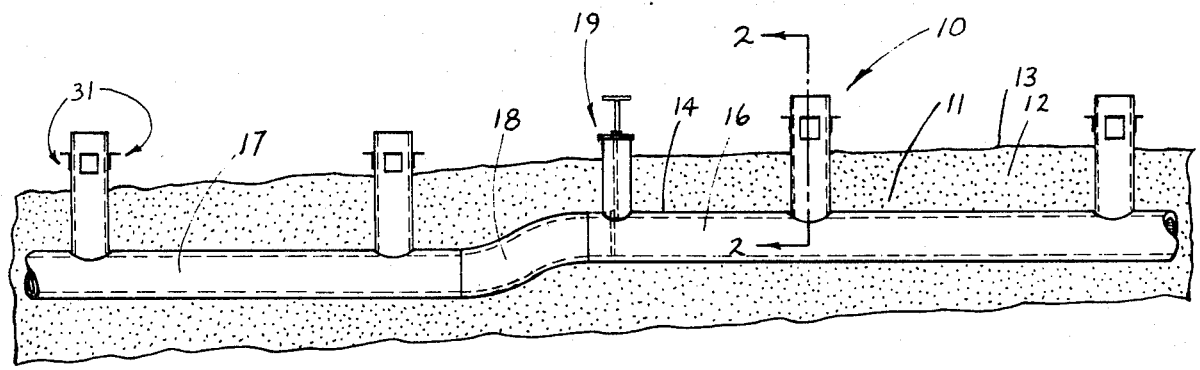
Fig. 1
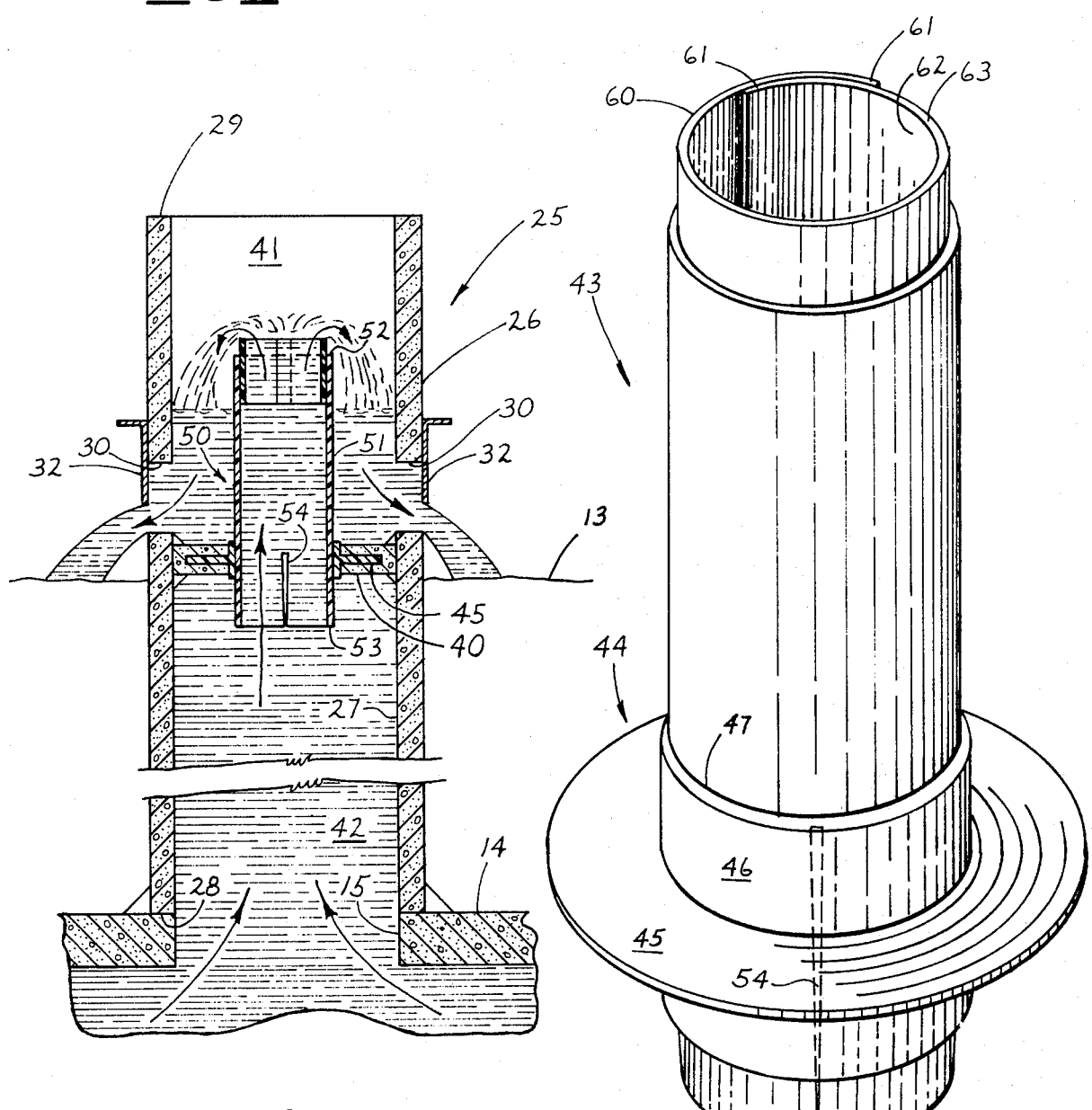
Fig. 2
Fig. 3

FLUID DISPENSING DEVICE

BACKGROUND OF THE INVENTION

The present invention relates to a fluid dispensing device and more particularly to such a device which is adapted for use on agricultural irrigation systems to distribute water supplied through the system in individually apportioned amounts and which provides an improved structure so as to insure that the device does not become jammed by particulate matter over long periods of use, is fully adjustable for the control of fluid flow therefrom and remains fully operable for a prolonged operational life, but is easily disassembled for the replacement of worn or damaged parts when necessary.

The applicant's U.S. Pat. No. 3,159,172 entitled "Fluid Dispensing Device" which has been assigned to the United States discloses a successful irrigation system incorporating a fluid dispensing device which permits precise and permanent adjustment of water distribution from the system while precluding damage incident to air entrapment and pressure surges encountered with conventional irrigation systems. This device has proved to be of significant importance in irrigation particularly where vast agricultural acreages are involved so as to require a multitude of individual fluid dispensing devices. Thus, unlike the prior art devices, the applicant's patented fluid dispensing device can be permanently adjusted for the proportioned dispensing of irrigation waters without requiring the frequent readjustment required with conventional devices yet permitting quicker, easier and more precise adjustment than previously known devices for the purpose.

While the aforementioned patented device has proved to be of enormous value, several operational attributes have developed particularly over long periods of use which detract from its otherwise unimpaired performance. As disclosed in the aforementioned patent, the device has a guide ring affording an internal annular channel within which is received an O-ring. The O-ring serves the function of providing frictional sealing engagement between the guide ring and an elongated tube which is endwardly adjustable within the O-ring to control the rate of fluid flow through the device. Over long periods of use, this O-ring is subjected to a variety of conditions which interfere with its operation. Fertilizers, chemical additives, herbicides and the like are frequently discharged through such irrigation systems. While the O-ring is not directly exposed to such substances borne by irrigation water, seepage does occur during use which places the O-ring in contact with the substances. Prolonged exposure to such substances, particularly those which are caustic, sometimes causes the breakdown of the structure of the O-ring causing it to become fragmented. Conversely, prolonged exposure to some substances causes the O-ring to lose its resiliency. In either case, the device may thus become inoperable and require repair. Irrigation water having a high mineral content or bearing substances which readily precipitate out at the point of the constriction of fluid flow may cause the guide ring, O-ring and tube to become encrusted so as to cause the tube to seize in the O-ring precluding adjustment thereof. Similarly, dirt, sand, silt, trash and the like borne by the irrigation water can become jammed between the O-ring and the tube so as to cause the tube to leak and/or to become locked in position.

In any event, it has been found that over prolonged periods of use, the device must be disassembled for cleaning and the O-ring replaced in order to permit continued use of the device. Because of the great number of such devices in an irrigation system, this process is tedious, time consuming and therefore is an expensive operation although only rarely required. Furthermore, it is often difficult to obtain O-rings of the desired size in the quantity required thereby delaying reassembly of the irrigation system. Similar deficiencies include the fact that due to variations in the tolerances of the guide rings, O-rings and tubes, the tubes in some instances either fit too loosely in their respective O-rings or are of too great a diameter for insertion into the guide ring and O-ring. Finally, since adjustment of the tube occurs relative to the guide ring, such adjustment may actually cause damage to the guide ring, O-ring and/or tube where seizing has occurred as above described. In this instance adjustment itself causes damage requiring repair or replacement of the device.

Therefore, it has long been recognized that it would be desirable to have a fluid dispensing device which provides the operative advantages afforded by the applicant's aforementioned patented device while eliminating the problems encountered with prolonged use of that device so as to preclude seizing of the operative elements thereof, to avoid the necessity for the replacement of worn O-rings and to eliminate unwanted fluid leakage in a device which is less expensive to produce and which facilitates assembly and adjustment.

SUMMARY OF THE INVENTION

It is therefore an object of the present invention to provide an improved fluid dispensing device of the general character shown in U.S. Pat. No. 3,159,172.

Another object is to provide such a device which is adapted when used in multiples to provide a substantially constant predetermined apportionment of water delivered through an irrigation system without readjustment.

Another object is to provide such a device which is continuously open to the atmosphere so as to preclude damage incident to air entrapment and pressure surges.

Another object is to provide such a device which is fully adjustable to control the apportionment of water discharged therefrom, but which, once adjusted, does not require readjustment even over prolonged periods of use.

Another object is to provide such a device which eliminates the debilities which have been encountered with the operation of prior art devices over long periods of use.

Another object is to provide such a device which minimizes the susceptibility of the device to seizing of the operative elements thereof during use.

Another object is to provide such a device which mounts the adjustable element thereof at a readily accessible location remote from the mounting position.

Another object is to provide such a device which provides an ease of assembly and adjustment not heretofore available in prior devices.

A further object is to provide such a device which is of minimal expense to manufacture and to maintain.

Still further objects and advantages are to provide improved elements and arrangements thereof in an apparatus for the purposes described which is depend-

BRIEF DESCRIPTION OF THE DRAWINGS

FIG. 1 is a fragmentary side elevation of a water supply conduit of an irrigation system mounting a plurality of fluid dispensing devices of the present invention.

FIG. 2 is a somewhat enlarged transverse vertical section taken on line 2—2 of FIG. 1.

FIG. 3 is a somewhat enlarged perspective view of a portion of the fluid dispensing device.

DESCRIPTION OF THE PREFERRED EMBODIMENT

Figure 4:
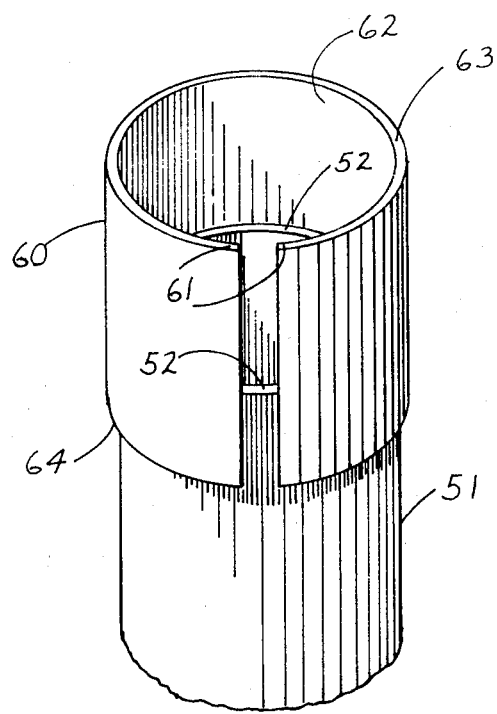
FIG. 4 is a fragmentary perspective view of the fluid dispensing device in a second configuration or adjustment.

The fluid dispensing device of the present invention is shown generally in FIGS. 2 through 5 and a multiplicity thereof in an irrigation system in FIG. 1. As shown best in FIG. 1, a plurality of such fluid dispensing devices are adapted to be mounted in an irrigating system 10 having a main supply conduit 11. The conduit is buried in the earth 12, in the conventional manner, a predetermined distance below the surface 13. The conduit consists of a cylindrical concrete wall 14 having a plurality of spaced, upwardly facing openings 15. As shown in FIG. 1, the conduit has an upper segment 16, a lower segment 17 and a connecting segment 18 interconnecting the upper and lower segments in fluid transferring relation. A conventional gate valve assembly 19 is mounted on the upper segment adjacent to the connecting segment for adjustably controlling the flow of water along the supply conduit from right to left as viewed in FIG. 1.

Each of the fluid dispensing devices has an elongated riser 25 having a substantially cylindrical concrete wall 26 defining an interior 27. Each riser has a lower end 28 which is mounted on the main supply conduit 11 in sealed communication with one of the upwardly facing openings 15. The riser has an opposite upper end 29 which extends a predetermined distance above the earth's surface 13. A pair of discharge orifices 30 are disposed in the cylindrical wall 26 of the riser defining an axis extending transversely through the riser spaced from the upper end thereof so that the orifices are positioned adjacent to and above the earth's surface, as shown in FIG. 2. Any other desired number and location of the orifices may be utilized. A gate valve assembly 31 is mounted in fluid controlling relation on the cylindrical wall of the riser in individual covering relation to each of the discharge orifices 30. Each gate valve assembly has a conventional sheet metal closure 32 mounted in vertically sliding adjustable relation, as shown in FIG. 2, selectively to control fluid flow from the riser through its respective orifice.

Each riser 25 has a transverse wall 40 integral with the cylindrical wall 26 and extending transversely of the interior 27 immediately below the discharge orifices 30, as shown in FIG. 2. The interior wall divides the interior of the riser into an upper chamber 41 and a lower chamber 42.

The interior wall 40 mounts a flow control assembly 43 incorporating the improvements of the present invention. The control assembly is preferably constructed of a suitable plastic material, such as polyvinyl chloride, polypropylene, or the like, for purposes of durability and resistance to corrosion. However, the assembly can be constructed of any of a variety of other suitable materials. The control assembly includes an annular mounting plate 44 which is mounted in the interior wall in axial alignment with the cylindrical wall 26 of the riser 25, as by being cast in the concrete thereof. It is noted that the mounting plate and interior wall can be assembled with the riser at the time of manufacture or installed in the riser subsequent to assembly of the main supply conduit 11 and risers, as desired. Additionally, the mounting plate of the control assembly can be installed at the site on either a new or existing riser, using a suitable binding substance. In any event, the mounting plate has an annular flange 45 secured in sealing relation in the interior wall and having a central, substantially cylindrical sleeve 46 extending concentrically of the cylindrical wall of the riser. The sleeve has a smooth internal passage 47 of any desired diameter.

A or tubular or member 50 is secured in the internal passage 47 of the cylindrical sleeve 46, as best shown in FIG. 2. The tubular member has a cylindrical wall 51, an upper end 52 and a lower end 53. A slot is extended longitudinally of the cylindrical wall of the tubular member from the lower end thereof to a predetermined point somewhat less than half the length of the cylindrical wall, as shown in FIGS. 2 and 3. The lower end of the tubular member is compressibly inserted in the passage 47 releasibly to lock or wedge the member in upstanding relation in the interior 27 of the riser.

Figure 5:
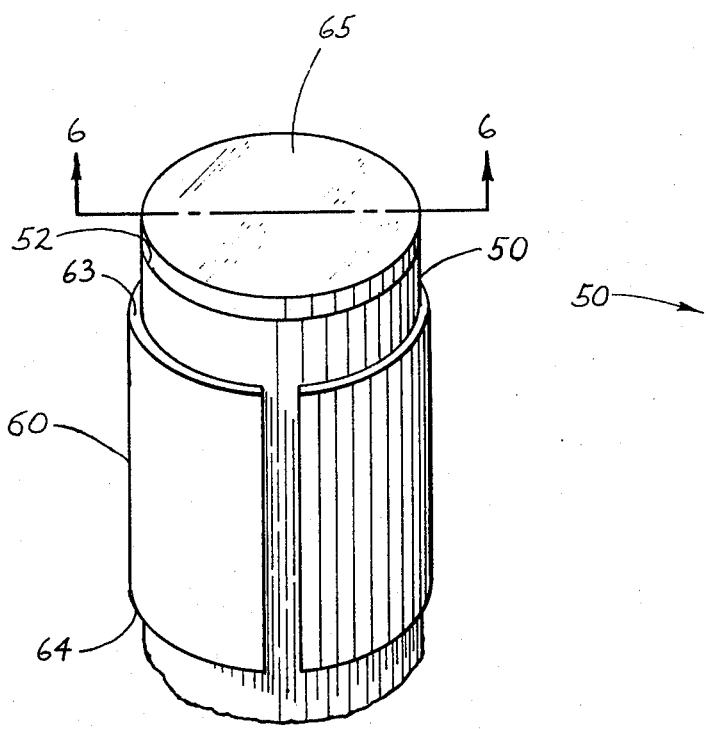
FIG. 5 is a fragmentary perspective view of the fluid dispensing device in a third operable configuration.
Figure 6:
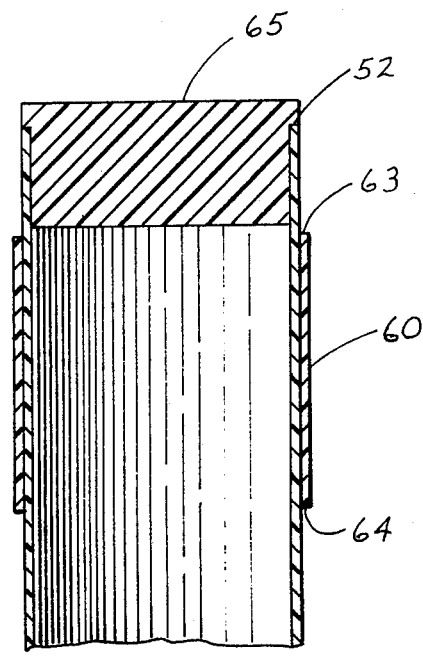
FIG. 6 is a fragmentary transverse vertical section taken on line 6—6 in FIG. 5.

A control sleeve 60 is mounted on the upper end 52 of the tubular member 50 in several alternate configurations as shown in FIGS. 3, 4 and 5. The control sleeve can be visualized as a cylinder which is longitudinally severed to provide opposite end portions 61 which are overlapped to constrict the cylinder or as a sheet of plastic rolled into a cylinder having overlapping opposite end portions 61. The sleeve has an interior 62, and upper end 63 and a lower end 64. The control sleeve, with its end portions in abutment, is preferably of the same diameter as the tubular member and resiliently maintains this configuration when not mounted on the tubular member. Thus, when the sleeve is circumferentially compressed so as to overlap the severed end portions to permit insertion of the sleeve into the upper end 52 of the tubular member, as shown in FIG. 3, the tendency for the sleeve to expand to resume its natural configuration causes the sleeve to be adjustably retained in position. Conversely, when the sleeve is expanded to separate the severed end portions for mounting as shown in FIGS. 4 and 5, the tendency of the sleeve to contract to resume its natural configuration retains the sleeve in position. A plug member 65 optionally releasably fitted in the upper end 52 of the tubular member, as shown in FIG. 5.

OPERATION

The operation of the described embodiment of the subject invention is believed to be clearly apparent and is briefly summarized at this point as used in an irrigating system shown in FIG. 1. The operation of such a system is described in detail in the applicant's aforementioned U.S. Pat. No. 3,159,172.

Adjustment of the system mounting the fluid dispensing devices of the present invention is accomplished by directing irrigating water through the main supply conduit 11 from right to left, as viewed in FIG. 1. The gate valve 19 is preferably left open for proper initial adjustment of the system. It should be noted that although the control sleeves 60 can be mounted in a variety of configurations as previously described, they are ordinarily mounted within their respective tubular members 50, as shown in FIG. 3. As the water fills the main conduit, it begins to rise in the risers 25 beginning with those of the lower segment 17 of the conduit. The control sleeves borne by the tubular members of the risers are then individually adjusted upwardly or downwardly to apportion the water to be discharged from each of the risers. This is expeditiously accomplished by simply sliding the control sleeve within the tubular member to adjust the upper end 63 of the sleeve to or from the upper end 52 of the tubular member to the position required to achieve the desired volume of water flow. As pointed out in the aforementioned patent, the positions of the upper ends of the control sleeves in any one segment of the irrigating system 10 determine the minimum-pressure head in the supply conduit necessary for water to be discharged through the respective risers.

When the risers of the lower segment 17 have been adjusted as described, the gate valve 19 is preferably closed. Subsequently, as the water rises in the risers 25 of the upper segment 16, the control sleeves 60 within the tubular members 50 of the risers of that segment are similarly individually adjusted to apportion fluid flow therefrom, as previously described.

An alternate configuration for mounting each control sleeve 60 on its respective tubular member 50 is created by pulling the severed end portions 61 of the sleeve from each other and slipping the sleeve about the exterior of the tubular member, as shown in FIG. 4. This configuration permits adjustment of the flow from the tubular members in a manner similar to that above described. Furthermore, this configuration frees the interior of the upper end 52 of the tubular member for the insertion of the plug member 65 if desired. When the plug member is mounted in the tubular member, its respective riser is sealed so that no water is discharged from the riser during operation of the irrigating system 10. Thus, the degree of control of the discharge of irrigating water from the system is enhanced. When a plug member is to be inserted in the tubular member as described, the control sleeve can be positioned downwardly about the tubular member as shown in FIG. 5. However, the selected vertical adjustment of the control sleeve need not be disturbed during positioning of the plug member within the upper end of the tubular member. In such case, when the plug member is removed, the flow control assembly 43 of the riser does not require readjustment. The space between the severed end portions 61 of the sleeve facilitates access to the plug member in this configuration to permit its removal from the tubular member.

By elimination of the O-ring of the device of the aforementioned U.S. Pat. No. 3,159,172, the fluid dispensing device 9 of the present invention is provided with a significantly extended maintenance free operational life. There are, in fact, no elements of the dispensing device which are commonly subject to wearing or breakdown over long periods of use as is the case where an O-ring is employed. The tubular member 50, being compressibly fitted in the internal passage 47 of the cylindrical sleeve 46, is securely retained in position.

In certain rare instances after considerably long periods of use, water borne substances may become encrusted on the tubular member 50 or cylindrical sleeve 46 to cause the tubular member to seize in the internal passage 47. In the unlikely event that this should occur, the operation and adjustment of the dispensing device is in no way affected since it is not the tubular member which is adjusted for apportionment of flow from the riser 25. Thus, the control sleeve 60, remote from the point of constricted fluid flow where encrustation by such substances is most likely, is not located at a position susceptible to seizing and remains fully adjustable on the tubular member. Furthermore, where the control sleeve is mounted as shown in FIG. 4 on the exterior of the tubular member, the danger of the control sleeve itself seizing on the tubular member is further reduced.

Since the tubular member 50 is pressure fitted within the internal passage 47, particulate matter such as dirt, silt, sand and the like borne by the water cannot seep between the member and the cylindrical sleeve 46 so as eventually to cause leakage. It will also be seen that should the tubular member or control sleeve 60 inadvertantly become damaged, replacement is expeditiously accomplished by simply pulling the damaged tubular member from the internal passage 47 and inserting a new tubular member, or removing the control sleeve if it alone is damaged. Since the lower end 53 of the member is compressible, a variation in tolerances of the tubular member or mounting plate is easily accommodated.

When the control sleeve 60 is mounted on the upper end 52 of the tubular member 50 as shown in FIG. 4, the severed end portions 61 are separated. In operation, this separation, of course, causes irrigation water to be discharged between the end portions of the sleeve as well as over the upper end 63 of the sleeve. This fact does not detract from the operation of the device since the volume of water discharged is selected during adjustment of the device as determined by the actual volume of such flow so as to take into account flow between the end portions.

Therefore, the fluid dispensing device of the present invention has all of the operative advantages of the applicant's previously patented fluid dispensing device while eliminating the debilities attendant to prolonged use of that device so as to preclude seizing of the operative elements thereof, to avoid the necessity for replacement of worn O-rings and to eliminate fluid leakage in a device which is less expensive to produce and facilitates assembly and adjustment.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A device for control of fluid discharge from a substantially upright riser connected to a source of fluid and having a fluid discharging opening comprising a mounting plate secured in the riser and extending transversely thereof intermediate the source and the opening and having a passage providing a substantially vertical axis; and a telescopic tubular means endwardly adjustable to regulate the hydrostatic head of fluid pressure required for fluid discharge through the riser from the source, said tubular means comprising a tubular member having an end portion compressible by insertion in the passage to mount said tubular member on the mounting plate in upright relation in the riser and a sleeve slidably received on the tubular member remote from the compressible end portion thereof to provide said telescopic endward adjustment of the tubular means.

2. The device of claim 1 in which the sleeve is divided longitudinally to define adjacent end portions adapted to be overlapped for compressible receipt of the sleeve internally of the tubular member and alternatively separated for tensioned receipt exteriorly of said member remote from the compressible end portion.

3. The device of claim 2 in which the compressible end portion of the tubular member has a longitudinal slot therein to accommodate compressible insertion of said member in the passage of the mounting plate.

4. The improvement of claim 2 in which a plug is selectively adapted to be inserted in the upper end of said tube to preclude discharge of fluid from the riser.

5. In a fluid dispensing device for an irrigation system, the device having a riser with a lower end in communication with the system, an opposite upper open end and an orifice extending laterally through the riser intermediate the upper and lower ends adapted to release the fluid received by the riser from the system, an improvement comprising an elongated, substantially cylindrical tube having upper and lower ends and a slot in the tube extending from the lower end thereof longitudinally of the tube to a point in spaced relation to the lower end; a substantially cylindrical control sleeve, having a diameter substantially equal to that of the tube, divided longitudinally to form a pair of adjacent end portions adapted for overlapping engagement for compressed insertion of the sleeve in the tube at its upper end and alternatively separation for tensioned mounting exteriorly of said tube; and a mounting plate borne by the riser internally thereof intermediate the lower end and the orifice and having a substantially cylindrical passage with an internal diameter smaller than the exterior diameter of the tube and adapted to receive the lower end of said tube in compressibly locking relation thereto in upright relation in the riser with the sleeve disposed above the mounting plate for endward adjustment in the tube to regulate the hydrostatic head of fluid pressure required in the system to discharge from the riser.

6. A fluid flow regulating device comprising a substantially erect riser; a partition disposed transversely in the riser having a passage therethrough of rigidly limited dimensions; a tubular member extended through the passage having an intake end below the partition, an outlet end above the partition, and an intermediate portion shaped to correspond to the passage and of slightly greater dimensions than the passage, said tubular member being slotted longitudinally from its intake end to a position adjacent to the partition for resilient constriction and being wedged tightly downwardly into the passage; and a sleeve slidably telescopically mounted on the outlet end of the tubular member.

7. The device of claim 6 in which the tubular member and the sleeve are of substantially the same diameter when unstressed and one thereof is longitudinally slotted, resiliently deformed and frictionally engaged in telescopic association with the other.

8. A fluid flow regulating device for connection to a source of fluid comprising means having a passage therethrough of fixed transverse dimensions adapted to be connected to said source with the passage in fluid communication therewith; a tubular member having a longitudinally slotted end portion compressed into the passage to mount said member in a substantially erect attitude in said means; and fluid conducting means having an upper discharge end and telescopically mounted by the tubular member at a position remote from said slotted end portion for endward adjustment therein to regulate the height of the discharge end of the conducting means.

9. The device of claim 8 in which said fluid conducting means includes a sleeve telescopically mounted on the tubular member and upwardly endwardly extended therefrom.

10. The device of claim 8 including a plug adapted for insertion in the upper end of said tubular member to preclude the discharge of fluid through said member from the source.

* * * * *

UNITED STATES PATENT OFFICE
CERTIFICATE OF CORRECTION

Patent No. 3,874,596     Dated April 1, 1975

Inventor(s)     Benjamin Baxter

It is certified that error appears in the above-identified patent and that said Letters Patent are hereby corrected as shown below:

In the Specification:

Column 4, line 25 after "A" and before "or" insert ---tube---.

Same line, after "tubular" and before "member" delete "or".

Signed and sealed this 20th day of May 1975.

(SEAL)
Attest:

RUTH C. MASON
Attesting Officer

C. MARSHALL DANN
Commissioner of Patents
and Trademarks